United States Patent
Shona (12) United States Patent (10) Patent No.: US 7,079,573 B2
(45) Date of Patent: Jul. 18, 2006

(54) APPARATUS AND METHOD FOR RECEIVING AND TRANSMITTING SERIAL DATA

(75) Inventor: Yoshihiro Shona, Tokyo (JP)

(73) Assignee: Oki Electric Industry Co., LTD, Tokyo (JP)

( * ) Notice: Subject to any disclaimer, the term of this patent is extended or adjusted under 35 U.S.C. 154(b) by 724 days.

(21) Appl. No.: 10/283,149

(22) Filed: Oct. 30, 2002

(65) Prior Publication Data

US 2003/0210738 A1 Nov. 13, 2003

(30) Foreign Application Priority Data

May 8, 2002 (JP) .............................. 2002-132543

(51) Int. Cl.
*H04B 1/38* (2006.01)
*H04B 5/16* (2006.01)

(52) U.S. Cl. ..................... 375/219; 375/222; 370/282

(58) Field of Classification Search ................. 375/354, 375/219, 222, 371; 370/230, 282; 713/600, 713/601, 501–503; 710/50, 60, 63, 106; 327/113
See application file for complete search history.

(56) References Cited

U.S. PATENT DOCUMENTS

| | | | | |
|---|---|---|---|---|
| 4,949,333 A | * | 8/1990 | Gulick et al. ................ | 370/282 |
| 6,016,309 A | * | 1/2000 | Benayoun et al. ........... | 370/252 |
| 6,553,062 B1 | * | 4/2003 | Marum ........................ | 375/222 |
| 2004/0114679 A1 | * | 6/2004 | Ryu et al. .................... | 375/222 |

FOREIGN PATENT DOCUMENTS

| | | |
|---|---|---|
| JP | 59-190724 | 10/1984 |
| JP | 10-075121 | 3/1998 |
| JP | 11-149325 | 6/1999 |

* cited by examiner

*Primary Examiner*—Phuong Phu
(74) *Attorney, Agent, or Firm*—Rabin & Berdo P.C.

(57) ABSTRACT

A serial data communication machine includes a counter for counting a reference clock and a shift register for receiving incoming and outgoing data. Every time the counter counts the reference clock certain times, which is equal to a first integer determined in accordance with a ratio of a reference clock frequency to a transfer rate, the data stored in the shift register are shifted such that the data are transmitted and received at a rate substantially equal to the transfer rate. The communication machine also includes a clock correction unit. Every time the reference clock is generated certain times, which is equal to a second integer determined in accordance with a difference between the above mentioned ratio and the first integer, the clock correction unit temporarily hinders passage of the reference clock to the counter. Even if one bit time is not a multiple of the reference clock, the communication machine can transfer the data at high speed without increasing the reference clock frequency.

8 Claims, 10 Drawing Sheets

| TRANSFER RATE = 372 kbps | | 1 BIT TIME | 1/2 BIT TIME | | ST | b0 | b1 | b2 | b3 | b4 | b5 | b6 | b7 | P | STP1 | STP2 |
|---|---|---|---|---|---|---|---|---|---|---|---|---|---|---|---|---|
| THEORETICAL VALUE & ACCEPTABLE RANGE | CLK | 9.62 | 4.81 | MAX [μs] | 3.22 | 5.91 | 8.60 | 11.29 | 13.97 | 16.66 | 19.35 | 22.03 | 24.72 | 27.41 | 30.10 | 32.78 |
| | μs | 2.687 | 1.344 | MIN [μs] | 2.15 | 4.84 | 7.52 | 10.21 | 12.90 | 15.59 | 18.27 | 20.96 | 23.65 | 26.33 | 29.02 | 31.71 |
| CONVENTIONAL UART (NO CORRECTION) 1/2 BIT = 5 CLK | CLK | 10 | 5 | MAX [μs] | 3.07 | 5.87 | 8.66 | 11.45 | 14.25 | 17.04 | 19.83 | 22.63 | 25.42 | 28.21 | 31.01 | 33.80 |
| | μs | 2.793 | 1.397 | MIN [μs] | 2.79 | 5.59 | 8.38 | 11.17 | 13.97 | 16.76 | 19.55 | 22.35 | 25.14 | 27.93 | 30.73 | 33.52 |
| 1ST EMBODIMENT UART (1/5 CORRECTION) 1/2 BIT = 4 CLK | CLK | 8 | 4 | MAX [μs] | 2.79 | 5.59 | 8.10 | 10.89 | 13.69 | 16.20 | 18.99 | 21.51 | 24.30 | 27.09 | 29.61 | 32.40 |
| | CORRECTED CLK | 5 | | MIN [μs] | 2.51 | 5.31 | 7.82 | 10.61 | 13.41 | 15.92 | 18.72 | 21.23 | 24.02 | 26.82 | 29.33 | 32.12 |

| TRANSFER RATE = 372 kbps | | 1 BIT TIME | 1/2 BIT TIME | | ST | b0 | b1 | b2 | b3 | b4 | b5 | b6 | b7 | P | STP1 | STP2 |
|---|---|---|---|---|---|---|---|---|---|---|---|---|---|---|---|---|
| THEORETICAL VALUE & ACCEPTABLE RANGE | CLK | 9.62 | 4.81 | MAX [μs] | 3.22 | 5.91 | 8.60 | 11.29 | 13.97 | 16.66 | 19.35 | 22.03 | 24.72 | 27.41 | 30.10 | 32.78 |
| | μs | 2.687 | 1.344 | MIN [μs] | 2.15 | 4.84 | 7.52 | 10.21 | 12.90 | 15.59 | 18.27 | 20.96 | 23.65 | 26.33 | 29.02 | 31.71 |
| CONVENTIONAL UART (NO CORRECTION) 1/2 BIT = 5 CLK | CLK | 10 | 5 | MAX [μs] | 3.07 | 5.87 | 8.66 | 11.45 | 14.25 | 17.04 | 19.83 | 22.63 | 25.42 | 28.21 | 31.01 | 33.80 |
| | μs | 2.793 | 1.397 | MIN [μs] | 2.79 | 5.59 | 8.38 | 11.17 | 13.97 | 16.76 | 19.55 | 22.35 | 25.14 | 27.93 | 30.73 | 33.52 |
| 2ND EMBODIMENT UART (1/25 CORRECTION) 1/2 BIT = 5 CLK | CLK | 10 | 5 | MAX [μs] | 3.27 | 5.87 | 8.38 | 10.93 | 13.38 | 16.48 | 19.27 | 21.79 | 24.58 | 27.09 | 29.89 | 32.67 |
| | CORRECT-ED CLK | 25 | | MIN [μs] | 2.99 | 5.59 | 8.10 | 10.65 | 13.10 | 16.20 | 18.99 | 21.51 | 24.30 | 26.81 | 29.61 | 32.39 |

APPARATUS AND METHOD FOR RECEIVING AND TRANSMITTING SERIAL DATA

BACKGROUND OF THE INVENTION

1. Field of the Invention

The present invention relates to an apparatus for receiving and transmitting asynchronous serial data (referred to as "UART" (Universal Asynchronous Receiver Transmitter)).

2. Description of the Related Art

Figure 9:
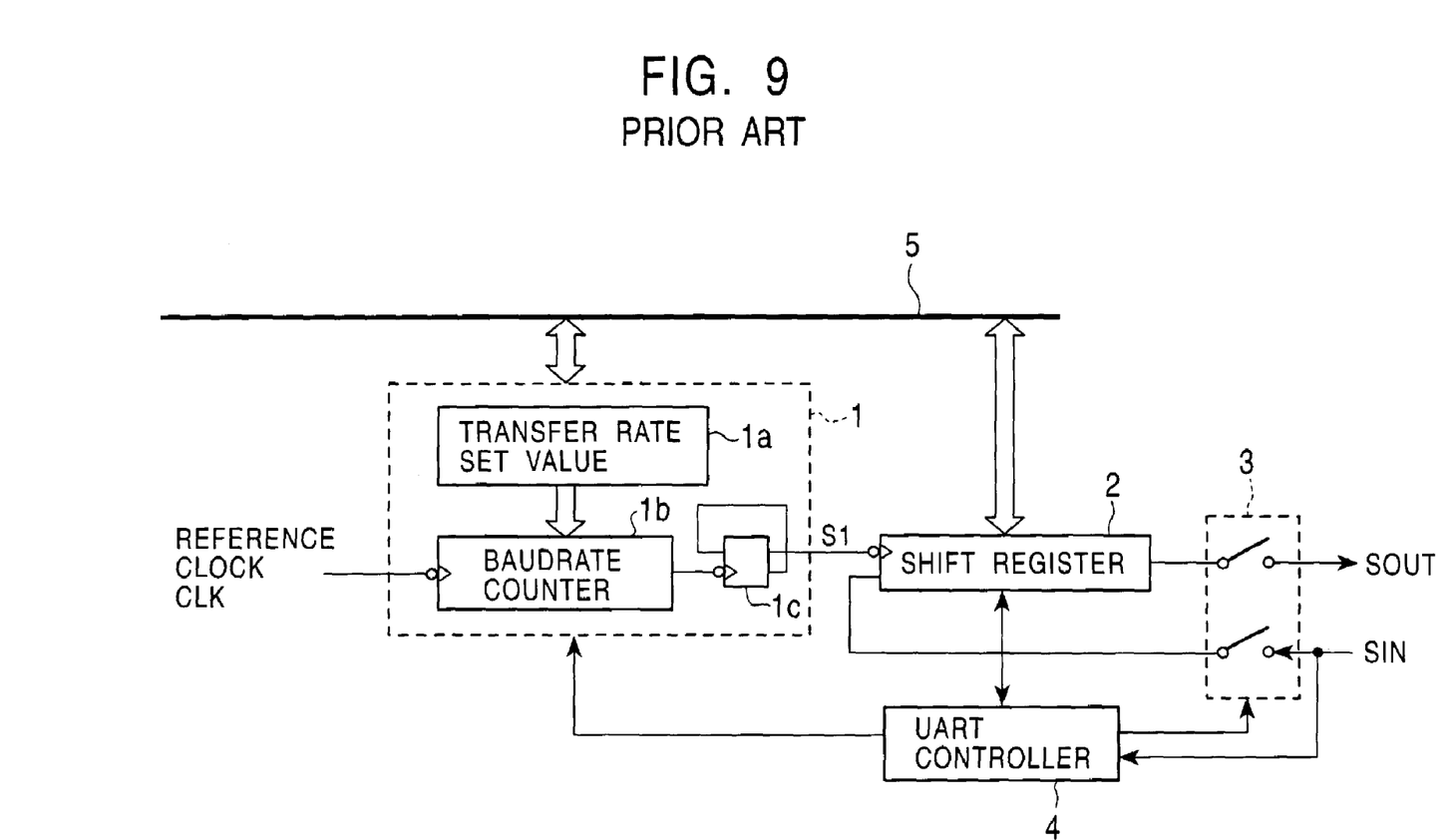
FIG. 9 illustrates a block diagram of a UART according to the prior art.

Referring to FIG. 9 of the accompanying drawings, a general structure of a conventional UART is illustrated. The UART includes a baudrate generator 1, a shift register 2, a switch 3 for switching between transmission and reception, and a UART controller 4. The UART is controlled by signals and data supplied from a data bus 5.

The baudrate generator 1 includes a register 1a to store a transfer rate set value, a baudrate counter (reload counter) 1b for loading the transfer rate set value to count a time corresponding to a half of one bit width of outgoing data, and a flip-flop 1c for receiving a carry signal from the baudrate counter 1b and supplying a shift clock S1 to the shift register 2.

A reference clock CLK which is utilized to determine the transfer rate is counted by the baudrate generator 1 such that the shift clock S1 having a period equal to the bit width is generated. The shift clock S1 is used by the shift register 2 to shift a transmission bit or reception bit in order to perform transmission and reception of serial data. Switching between transmission and reception is effected by the switch 3 under the control of the UART controller 4. Entry of the transfer rate set value, preparation of the outgoing data and retrieval of received data (incoming data) is performed through the data bus 5.

When a frequency of the reference clock is 4.9152 MHz and data should be transmitted at a transfer rate of 9600 bps, then the value in the register 1a is determined such that the baudrate counter 1b produces a carry signal every time the baudrate counter 1b counts the reference clock CLK 256 times. The flip-flop 1c supplies the shift clock S1 to the shift register 2 at intervals equal to 512 reference clocks. Thus, it is possible to send data at the data transfer rate of 9600 bps ($4.9152 \times 10^6/512 = 9600$ bps).

Figure 10:
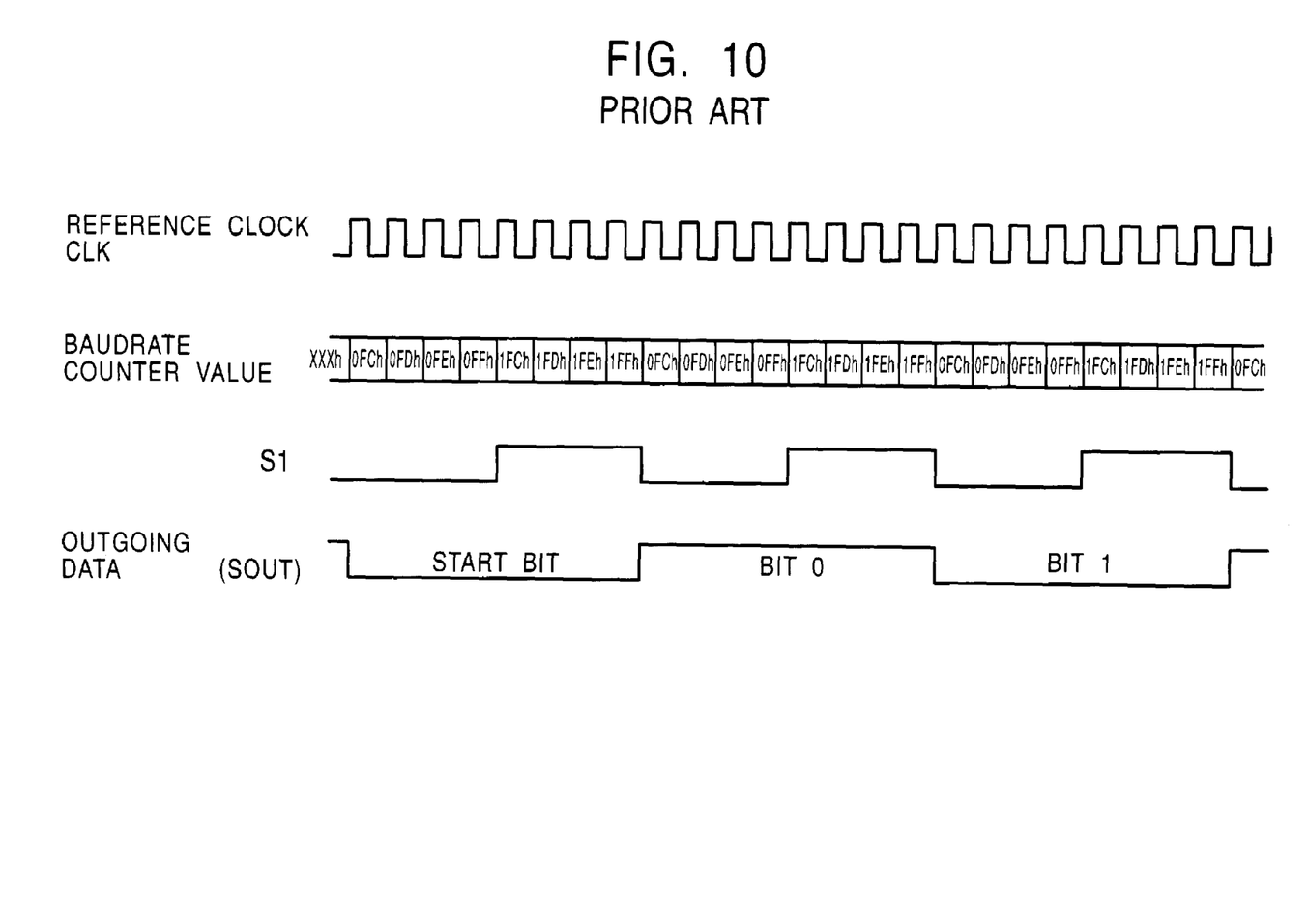
FIG. 10 is a timing chart showing an operation of another conventional UART.

FIG. 10 of the accompanying drawings illustrates an example when one bit width corresponds to eight reference clocks. The register 1a stores "FCh" such that the baudrate counter 1b outputs a carry signal every time the baudrate counter 1b counts the reference clock CLK four times. It should be noted that a baudrate counter value in the timing chart shown in FIG. 10 includes a value of the flip-flop 1c.

When the UART transfers data at a rate of 9600 bps with the reference clock frequency being 3.58 MHz (e.g., when an IC card is used), one bit time becomes 372.9166 . . . ($3.58 \times 10^6/9600 = 372.9166 \ldots$) and the transfer rate set value becomes 186.4583 . . . . In this case, an approximate value 186 is used as the transfer rate set value so that the transfer rate contains an error. In reality, however, since the transfer rate (9600 bps) is slow, the error would cause substantially no problem. In general, substantially no problem would occur as long as the time from the start bit to the n'th bit falls within $n \pm 0.2$ bit time. When the transfer rate is fast, such as 38.4 kbps, 76.8 kbps and 372 kbps, a significant gap will appear between a theoretical transfer rate set value and an actual transfer rate set value. High speed data transfer cannot be performed unless a frequency of the reference clock is increased to reduce the error.

SUMMARY OF THE INVENTION

An object of the present invention is to provide a serial data transmitting/receiving apparatus that can transfer data at high speed without increasing a frequency of a reference clock, even if one bit time is not a multiple of the reference clock.

According to a first aspect of the present invention, there is provided an apparatus for transmitting and receiving serial data comprising: a counter for counting a reference clock; and a shift register for storing incoming or outgoing data, wherein every time the counter counts the reference clock a first number of times, which is equal to a first integer determined in accordance with a ratio of a frequency of the reference clock to a data transfer rate, the incoming or outgoing data stored in the shift register are shifted such that the incoming or outgoing data are received or transmitted at a rate substantially equal to the data transfer rate, the improvement including a clock correction unit for temporarily hindering the reference clock from being passed to the counter every time the reference clock is generated a second number of times, which is equal to a second integer determined in accordance with a difference between the ratio and the first integer. The serial data transmitting and receiving apparatus can therefore transfer the data at high speed without increasing the frequency of the reference clock, even if one bit time is not a multiple of the reference clock.

According to a second aspect of the present invention, there is provided an apparatus for transmitting and receiving serial data comprising: a counter for counting a reference clock; and a shift register for storing incoming or outgoing data, wherein every time the counter counts the reference clock a first number of times, which is equal to a first integer determined in accordance with a ratio of a frequency of the reference clock to a data transfer rate, the incoming or outgoing data stored in the shift register are shifted such that the incoming or outgoing data are received or transmitted at a rate substantially equal to the data transfer rate, the improvement including a clock correction unit for temporarily doubling the frequency of the reference clock every time the reference clock is generated a second number of times, which is equal to a second integer determined in accordance with a difference between the ratio and the first integer.

According to a third aspect of the present invention, there is provided an apparatus for transmitting and receiving serial data comprising: a counter for counting a reference clock; and a shift register for storing incoming or outgoing data, wherein every time the counter counts the reference clock a first number of times, which is equal to a first integer determined in accordance with a ratio of a frequency of the reference clock to a data transfer rate, the incoming or outgoing data stored in the shift register are shifted such that the incoming or outgoing data are received or transmitted at a rate substantially equal to the data transfer rate, the improvement including: a first clock correction unit for temporarily hindering the reference clock being passed to the counter every time the reference clock is generated a second number of times, which is equal to a second integer determined in accordance with a difference between the ratio and the first integer; a second clock correction unit for temporarily doubling the frequency of the reference clock every time the reference clock is generated a third number of times, which is equal to a third integer determined in accordance with the difference between the ratio and the first integer; and a selector for selectively activating the first or second clock correction unit based on an external signal.

According to a fourth aspect of the present invention, there is provided a method of transmitting and receiving serial data comprising the steps of: A) determining a first integer on the basis of a ratio of a frequency of a reference clock to a data transfer rate; and B) shifting out a bit train, which constitutes (defines) incoming or outgoing data, every time the reference clock is counted a first number of times equal to the first integer, thereby transmitting or receiving the outgoing or incoming data at a rate substantially equal to the data transfer rate, the improvement including the steps of: C) determining a second integer in accordance with a difference between the ratio and the first integer after Step A; and D) temporarily stopping counting the reference clock every time the reference clock is generated a second number of times equal to the second integer during Step B.

According to a fifth aspect of the present invention, there is provided a method of transmitting and receiving serial data comprising the steps of: A) determining a first integer on the basis of a ratio of a frequency of a reference clock to a data transfer rate; and B) shifting out a bit train, which constitutes (defines) incoming or outgoing data, every time the reference clock is counted a first number of times equal to the first integer, thereby transmitting or receiving the outgoing or incoming data at a rate substantially equal to the data transfer rate, the improvement including the steps of: C) determining a second integer in accordance with a difference between the ratio and the first integer after Step A; and D) temporarily doubling the frequency of the reference clock every time the reference clock is generated a second number of times equal to the second integer during Step B.

DETAILED DESCRIPTION OF THE INVENTION

Embodiments of the present invention will be described with reference to the accompanying drawings.

FIRST EMBODIMENT

Figure 1:
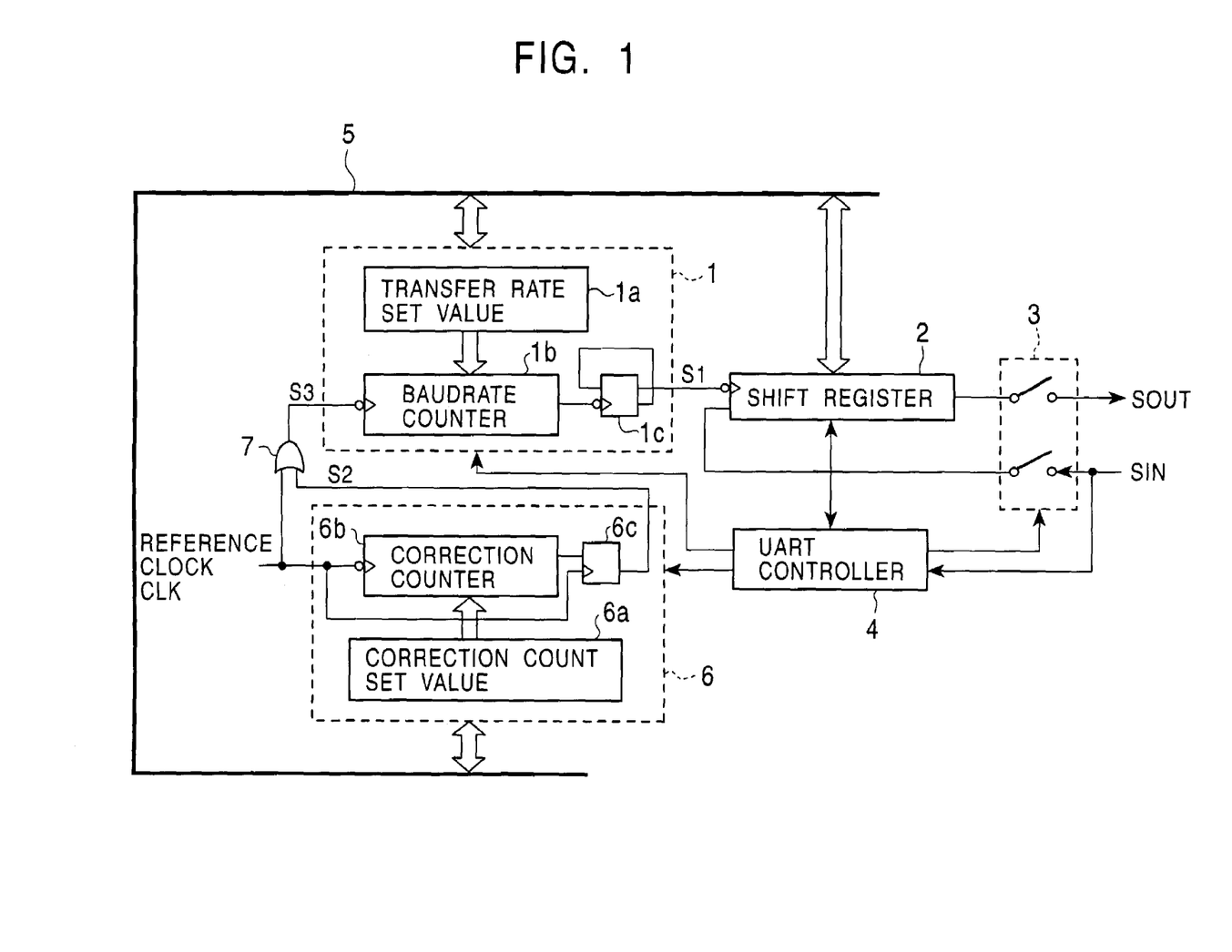
FIG. 1 illustrates a block diagram of a UART according to a first embodiment of the present invention.

Referring to FIG. 1, a UART according to a first embodiment of the present invention is illustrated. Similar reference numerals are used to designate similar elements in FIGS. 1 and 9, and description of such elements is omitted. Different and new elements as compared with the UART shown in FIG. 9 are only described below. The UART of the first embodiment includes two additional elements, namely, a correction counter 6 and an OR gate 7.

The correction counter 6 includes a correction count register 6a for storing a correction count set value, a correction counter (auto reloadable counter) 6b for counting the reference clock CLK up to the correction count set value, and a flip-flop 6c for capturing a signal outputted from the correction counter 6b during the rising edge of the next reference clock CLK every time all bits in the correction counter 6b become "1", i.e., every time the reference clock CLK is counted up to the correction count set value, in order to produce a carry signal S2.

The carry signal S2 and the reference clock CLK are introduced to the OR gate 7. An output signal S3 of the OR gate 7 is a corrected clock signal and introduced to the baudrate generator 1. The UART controller 4 controls the overall UART including the correction counter 6. The OR gate 7 is used to temporarily stop the reference clock.

A serial data transfer operation of the UART of this embodiment, which has the above described structure, will be described with reference to the timing chart shown in FIG. 2. It should be assumed here that the frequency of the reference clock CLK is 3.58 MHz, the transfer rate is 372 kbps, the baudrate counter 1b has 8 bits (9 bits if the flip-flop 1c is included), and the correction counter 6b has 7 bits.

In this example, one bit time (i.e., number of the reference clocks included in one bit of the transmission data) is about 9.62 CLK ($3.58 \times 10^6 / 372 \times 10^3 \approx 9.62$ clocks) so that the transfer rate set value and the correction count value are determined by the following equations:

Transfer Rate Set Value=256-int(1/2×reference clock frequency/transfer rate)=256-int($1/2 \times 3.58 \times 10^6 / 372 \times 10^3$)=256-4=252=FCh Correction Count Value=rounding up for a value of five or more and down for a value of four or less of [1/{1 bit time/(2×(256-transfer rate set value))-1}]-1=[1/{9.62/(2×(256-252))-1}]-1=1/(9.62/8-1)-1=1/0.2025-1≈4h Inside the baudrate generator 1, the transfer rate set value FCh supplied to the baudrate count register 1a via the data bus 5 is directly loaded into the baudrate counter 1b when the UART starts the data transmitting or receiving operation, and when the baudrate counter 1b generates a carry signal (i.e., when FFh changes to 00h). "1" is loaded to the flip-flop 1c when the data reception is started, and "0" is loaded to the flip-flop 1c when the data transmission is started. The flip-flop 1c reverses every time the baudrate counter 1b generates the carry signal.

The correction count set value 4h is supplied to the correction count register 6a via the data bus 5. Inside the correction counter 6, the reversal of the correction count set value 7Bh (7Fh-4h=7Bh) is loaded into the correction counter 6b when the UART starts the data transmitting or receiving operation.

In this manner, the transfer rate set value and the correction count set value are determined. Then, the switch 3 is operated to enter the data transmission mode such that the data is supplied to the shift register 2 via the data bus 5. Subsequently, the UART controller 4 starts the transmission operation. "FCh" is loaded to the baudrate counter 1b, "0" is loaded to the flip-flop 1c, and "7Bh" is loaded to the correction counter 6b. These two counters then start the counting.

Figure 2:
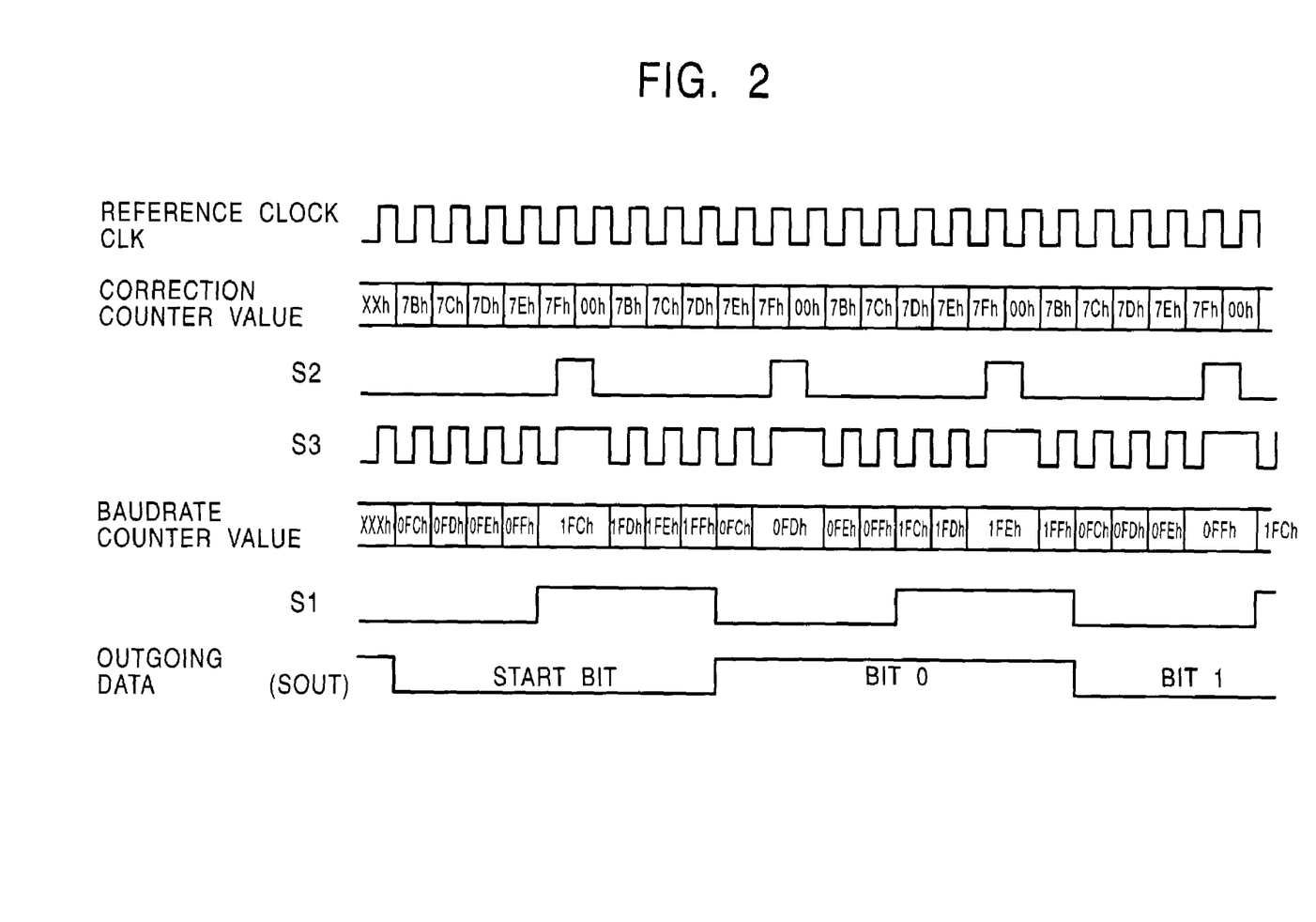
FIG. 2 is a timing chart showing an operation of the UART shown in FIG. 1.

As illustrated in FIG. 2, the flip-flop 6c accepts the carry signal during the rising edge of the reference clock CLK when all the bits in the correction counter 6b become "1" (i.e., when the count value becomes 7Fh), and produces the carry signal S2 having a high level maintaining period, which is twice as long as the single reference clock CLK. The correction counter 6b reloads the correction count set value during the next counting operation after all the bits in the correction counter 6b become "0". Then, the above described operation is repeated.

The carry signal S2 is supplied to the OR gate 7. Another input to the OR gate 7 is the reference clock. The OR gate 7 produces a logic sum of the carry signal S2 and the reference clock and supplies the logic sum as the clock S3 to the baudrate counter 1b. As shown in FIG. 2, the clock S3 is held at the high level while the carry signal S2 is at the high level. In this embodiment, therefore, two reference clocks are combined for every five reference clocks.

The baudrate counter 1b counts the signal S3. When the count value reaches FFh and the next clock is supplied to the baudrate counter 1b, the flip-flop 1c reverses. At the same time, the baudrate counter 1b reloads the transfer rate set value. The shift register 2 shifts the data when the falling edge of the carry signal S1 outputted from the flip-flop 1c is detected. After that, the data is serially transmitted.

Intervals between falling edges of the carries S1 which trigger the data shifting are not always constant because the correction is made to the respective falling edge interval by the correction counter 6. The correction eliminates the error caused when the bit time is not a multiple of the reference clock. In the above described example, the transfer rate set value is determined such that the one bit time becomes eight reference clocks. However, since the two reference clocks are combined for every five reference clocks, the one bit time becomes 9.6 (8×6/5=9.6). This value is very close to a theoretical one bit time (9.62).

Figure 3:
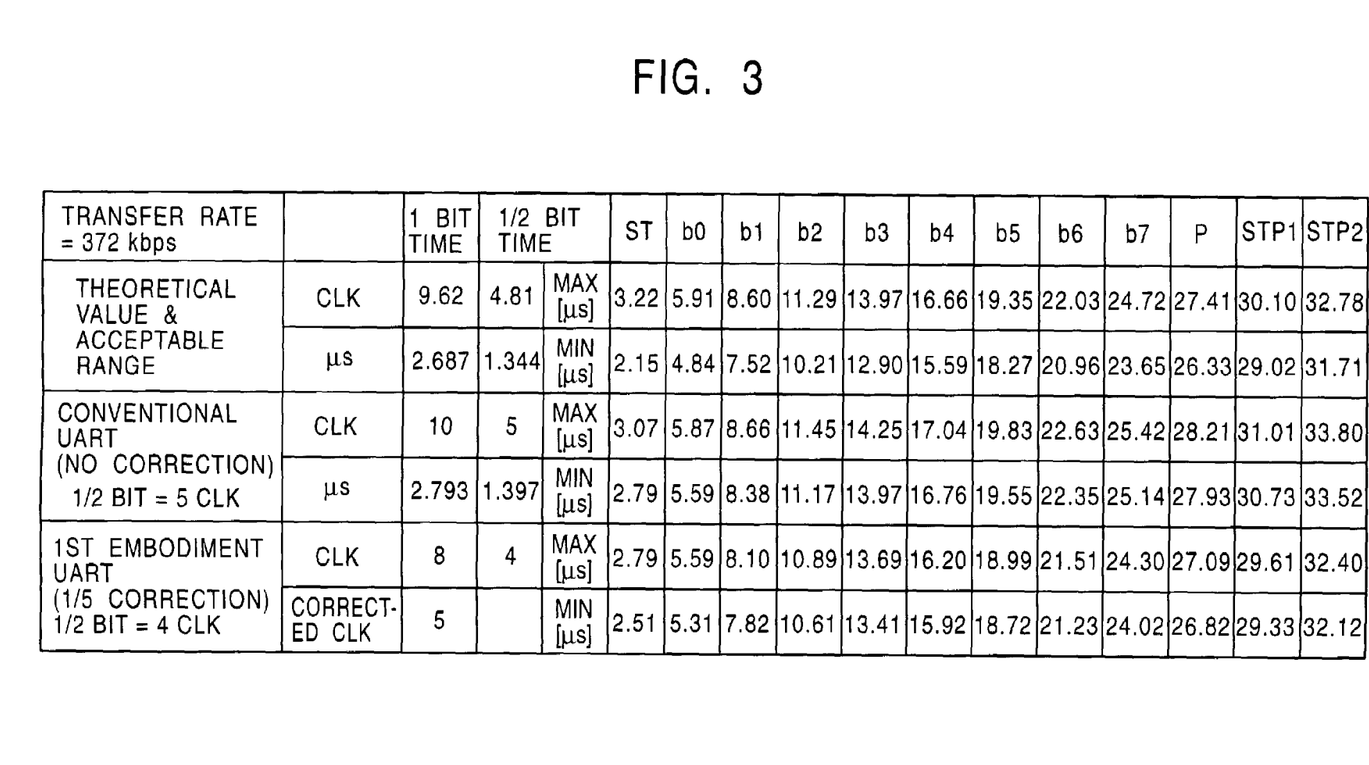
FIG. 3 is a table comparing the UART of the prior art with the UART shown in FIG. 1 with respect to accuracy in bit-to-bit intervals.

FIG. 3 is a table that shows the time from the start bit to the end of the respective bit when a 12-bit frame (one start bit ST, eight data bits b0 to b7, one parity bit P, two stop bits STP1 and STP2) is transmitted. Three cases are compared with each other in this table. Specifically, one case represents an ordinarily acceptable time range, one case represents data transmission by the conventional UART, and one case represents data transmission by the UART of the above described first embodiment. Each case has a maximum value ("MAX") and a minimum value ("MIN") because discrepancy of one reference clock at most arises in detecting the falling edge of the start bit when receiving the data. It is clear from this table that all the bits of the frame falling within the acceptable time range when the UART of the first embodiment is utilized.

As understood from the foregoing, the first embodiment can achieve high speed data transfer without increasing the reference clock frequency. The first embodiment can also reduce power consumption of the UART because the high speed data transfer is achieved using the reference clock having a low frequency. The clock correction counter 6 and the OR gate 7 operate in combination to temporarily hinder the reference clock from being passed to the baudrate counter 1b.

SECOND EMBODIMENT

Figure 4:
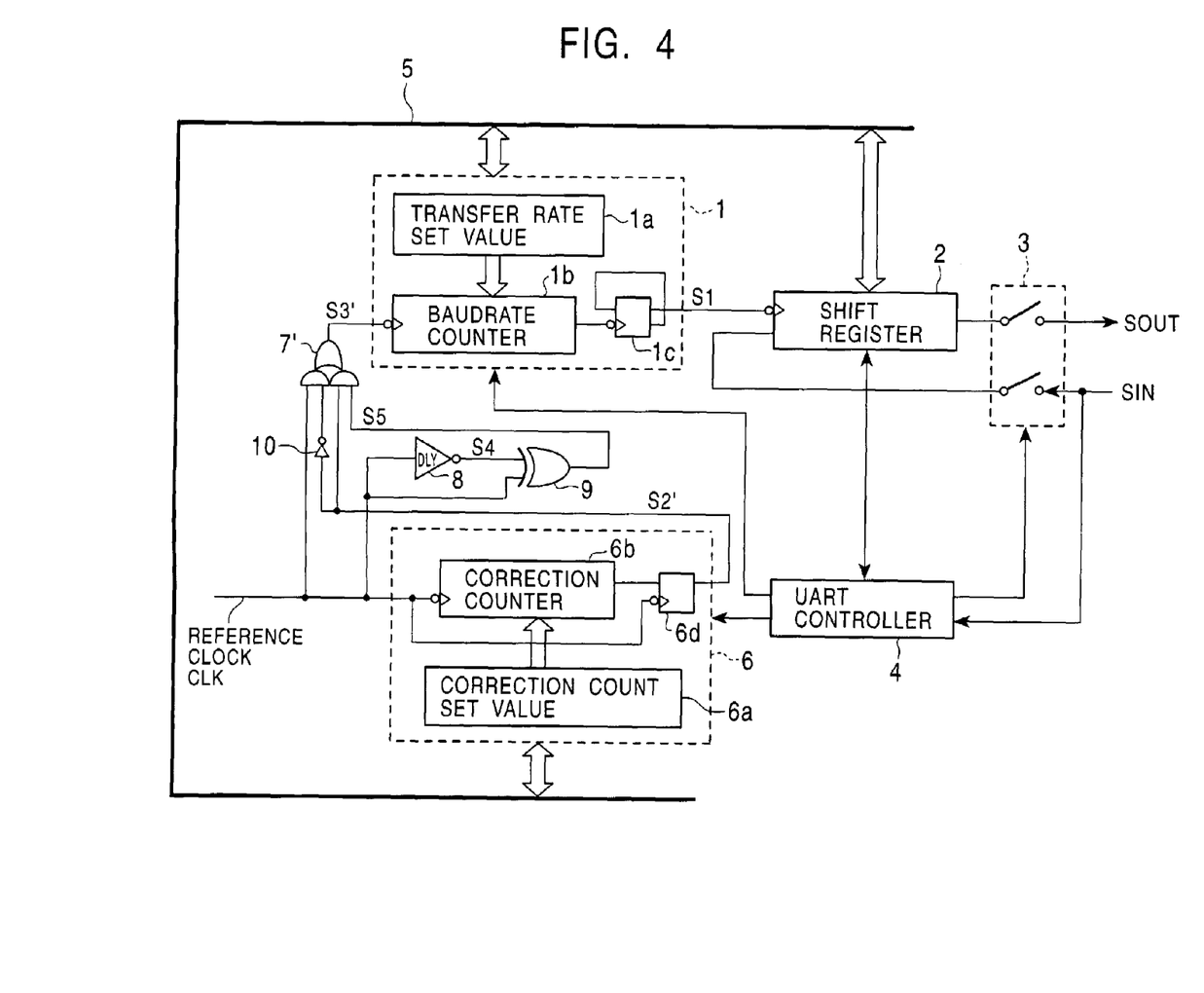
FIG. 4 illustrates a block diagram of a UART according to a second embodiment of the present invention.

Referring to FIG. 4, a UART according to a second embodiment of the present invention will be described. Similar reference numerals are used to designate similar elements in the first and second embodiments, and a description of such elements is omitted. Different and/or additional elements and structure, as compared with the first embodiment, are only described below.

As shown in FIG. 4, the flip-flop 6c of the first embodiment is replaced by a flip-flop 6d in the second embodiment. The flip-flop 6c is triggered by the rising edge of the carry signal whereas the flip-flop 6d is triggered by the falling edge of the carry signal. In addition, the OR gate 7 of the first embodiment is replaced by an ANDOR gate 7'. Further, an inverter gate 8 and an XOR gate 9 are additionally provided. The inverter gate 8 causes a delay of about one quarter of a reference clock CLK.

The reference clock CLK is introduced to the input of the inverter gate 8 and one of two inputs of the XOR gate 9. An output signal S4 of the inverter gate 8 is supplied to the other input of the XOR gate 9. An output signal S5 of the XOR gate 9 and an output signal S2' of the flip-flop 6d are both supplied to one of two AND gates of the ANDOR gate 7'. The reference clock CLK and a signal which is obtained by inverting the output signal S2' by the inverter 10 are both supplied to the other AND gate of the ANDOR gate 7'. Other elements and structure of the UART of this embodiment are similar to those of the first embodiment so that they will not be described here.

Figure 5:
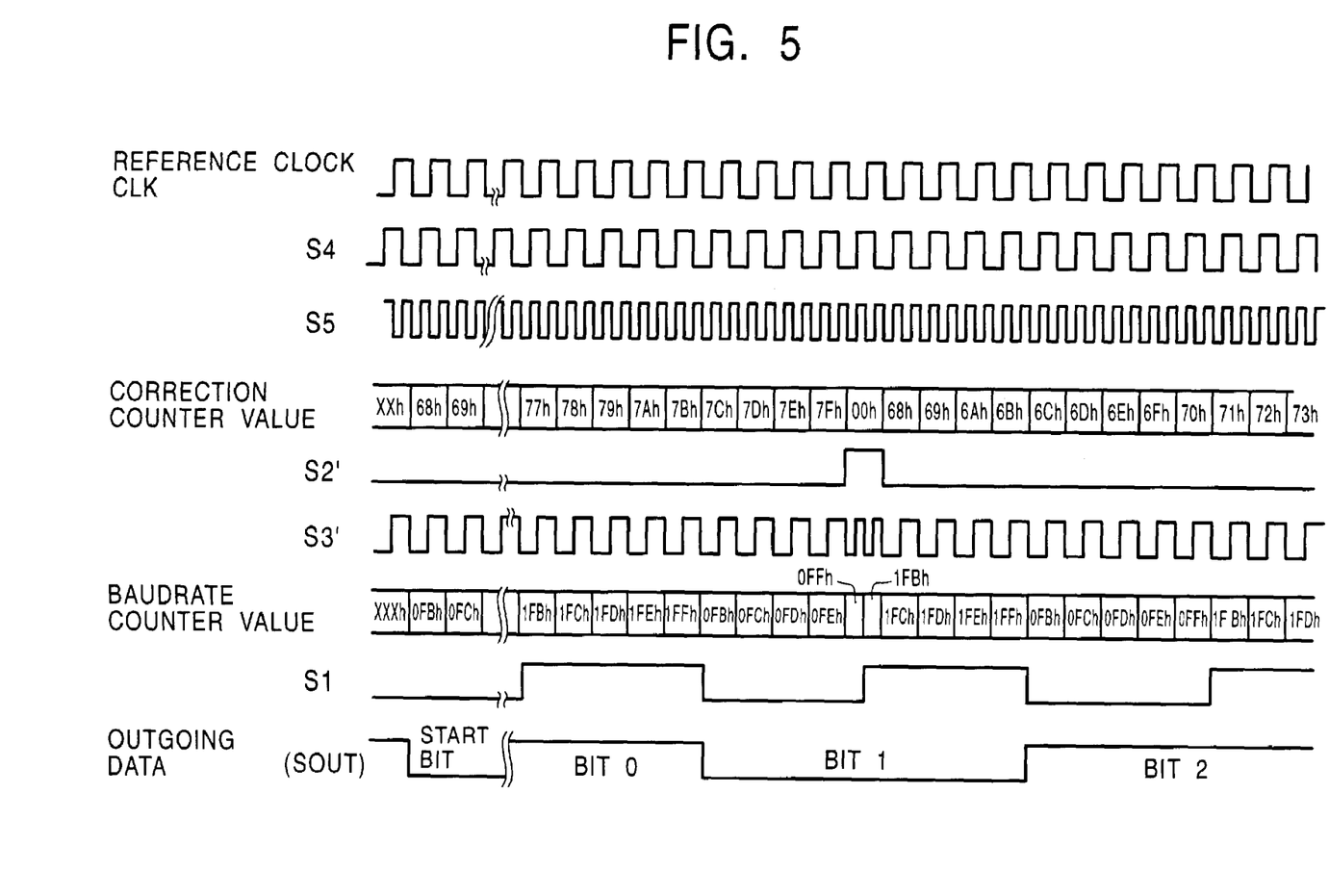
FIG. 5 is a timing chart showing an operation of the UART shown in FIG. 4.

The operation of the UART of the second embodiment will be described in reference to a timing chart shown in FIG. 5. Like the first embodiment, the frequency of the reference clock CLK is 3.58 MHz, the transfer rate is 372 kbps, the baudrate counter 1b has 8 bits (9 bits if the flip-flop 1c is included), and the correction counter 6b has 7 bits in this embodiment. Thus, the following description deals with only the difference between the first and second embodiments.

In the second embodiment, the transfer rate set value and the correction count value are calculated by the following equations:

Transfer Rate Set Value=rounding up of 256−(1/2× reference clock frequency/transfer rate)=rounding up of 256−(1/2×3.58×10$^6$/372×10$^3$)=256−5=251=$FBh$ Correction Count Value=rounding up for a value of five or more and down for a value of four or less of [1/{(2×(256−transfer rate set value)/1 bit time)−1}]−2=[1/{(2×(256−251)/9.62)−1}]−2=1/(10/9.62−1)−2=1/0.0395−2=23.3≈23=17$h$ The reference clock CLK is delayed when the reference clock passes through the inverter gate 8. After the inverter gate 8, the reference clock becomes a signal S4 which has a waveform shown below the waveform of the reference clock CLK in FIG. 5. An XOR of the signal S4 and the reference clock CLK is calculated by the XOR gate 9. The resulting XOR is a clock signal S5, and is outputted from the XOR gate 9. In other words, the XOR gate 9 produces the clock signal S5 which has a frequency twice the reference clock.

At the start of the data transmission, the value stored in the register 1a is loaded into the baudrate counter 1b and the value stored in the register 6a is loaded into the correction counter 6b. Counting operations then start in the baudrate counter 1b and correction counter 6b respectively. When all the bits in the correction counter 6b become "0", the output of the correction counter 6b goes to a high level signal. The output S2' of the flip-flop 6d goes to a high level signal when the reference clock CLK falls. At this time, all the bits in the correction counter 6b go to "0". The output S2' goes to a low level signal upon falling of the next reference clock CLK.

Subsequently, the inverted data of the correction count value is reloaded to the correction counter 6b. Then, the correction counter 6 repeats the above described operations.

The signal S2' is used as a control signal to switch the clock, which is counted by the baudrate counter 1b. The ANDOR gate 7' outputs the reference clock CLK as the signal S3' when the signal S2' is a low level signal, whereas the ANDOR gate 7' outputs the clock S5, which has a frequency twice the reference clock, as the signal S3' when the signal S2' is a high level signal.

In the second embodiment, the signal S2' becomes a high level signal every time twenty-five reference clocks are generated. Thus, when the count value of the baudrate counter 1b reaches 26, only twenty-five reference clocks are generated in reality. This means that the correction is made by the correction counter 6. Specifically, although the transfer rate set value is decided such that one bit time becomes equal to ten reference clocks in the second embodiment, an actual one bit time is 9.62 (10×25/26=9.62). This substantially coincides with the theoretical one bit time.

As understood from the foregoing, the second embodiment enables high speed data transfer without increasing the frequency of the reference clock, even if the one bit time is not a multiple of the reference clock. The second embodiment can also reduce power consumption of the UART because the high speed data transfer is achieved using the reference clock having a low frequency. These advantages are the same as the first embodiment.

Figure 6:
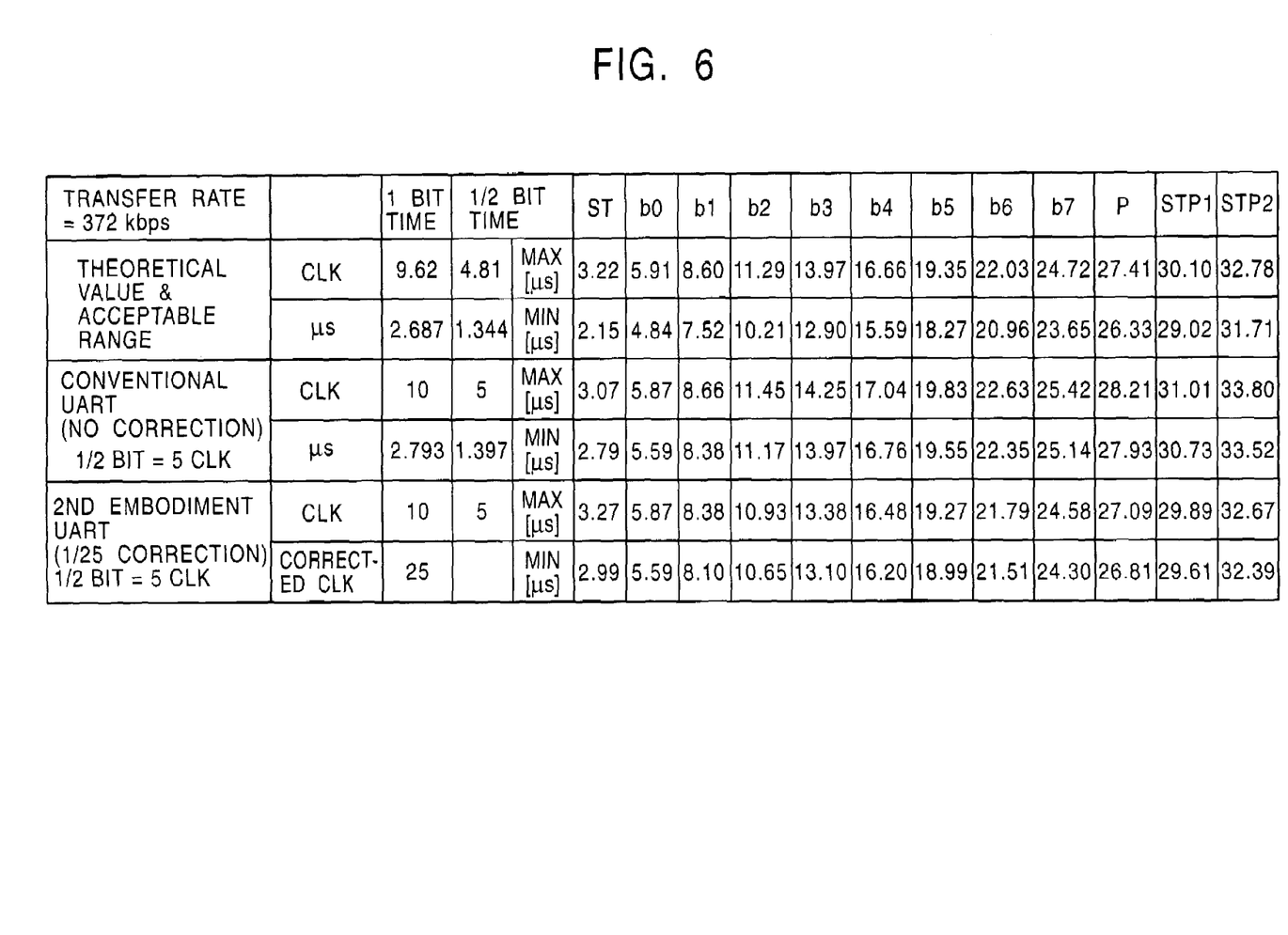
FIG. 6 is a table comparing the UART of the prior art with the UART shown in FIG. 4 with respect to accuracy in bit-to-bit intervals.

FIG. 6 is a table that shows the time from the start bit to the end of the respective bit when a 12-bit frame (one start bit ST, eight data bits b0 to b7, one parity bit P, two stop bits STP1 and STP2) is transmitted. Three cases are compared with each other in this table. Specifically, one case represents an ordinarily acceptable time range, one case represents data transmission by the conventional UART, and one case represents data transmission by the UART of the second embodiment. Each case has a maximum value ("MAX") and a minimum value ("MIN") because discrepancy of one reference clock at most arises in detecting the falling edge of the start bit when receiving the data. Like the first embodiment, it is clear from this table that all the bits of the frame falling within the acceptable time range when the UART of the second embodiment is utilized.

In the second embodiment, the relationship of "transfer rate set value×2">"theoretical bit time (number of clocks)" is established, and the correction counter makes a correction such that the actual bit time decreases. Therefore, relative accuracy increases as the theoretical bit time becomes closer to the transfer rate set value×2. Consequently, the second embodiment provides higher accuracy than the first embodiment when the difference between the theoretical bit time and the transfer rate set value×2 is less than the first embodiment.

THIRD EMBODIMENT

Figure 7:
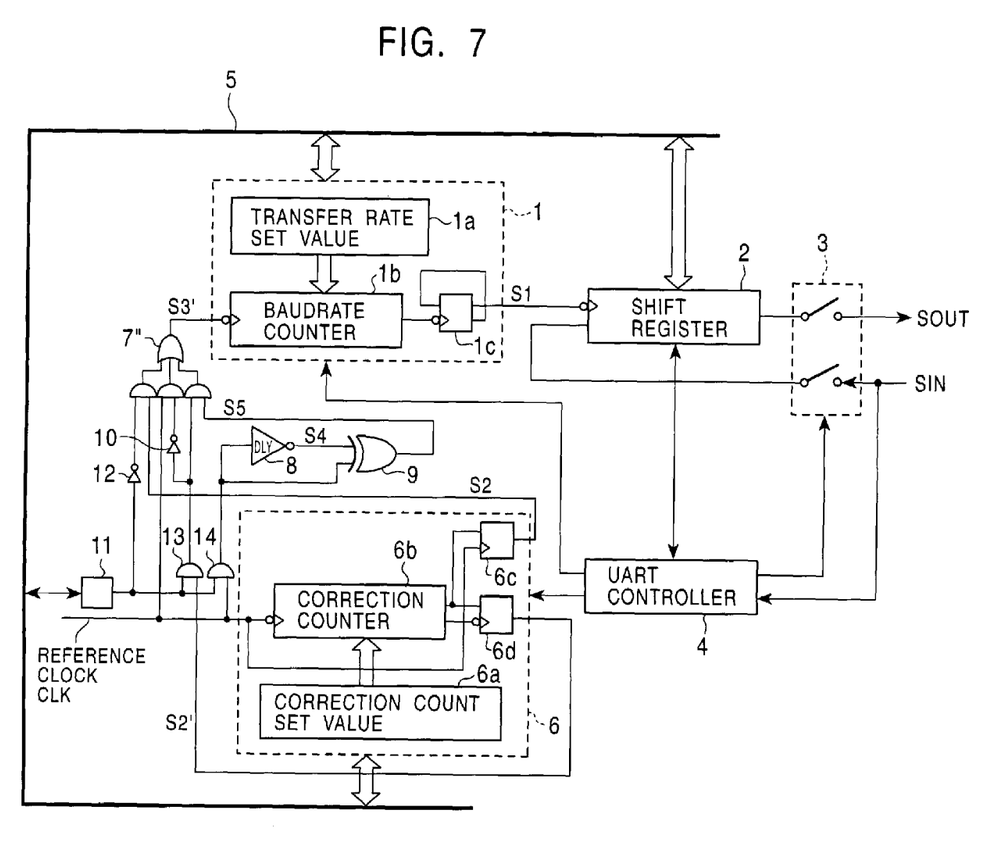
FIG. 7 illustrates a block diagram of a UART according to a third embodiment of the present invention.

Referring to FIG. 7, a UART according to a third embodiment of the present invention will be described. Similar reference numerals are used to designate similar elements in the first, second and third embodiments. As shown, the correction counter 6b is connected to the two flip-flops 6c and 6d such that the UART of the third embodiment has both the function of the first embodiment and the function of the second embodiment. The UART of the third embodiment has an ANDOR gate 7", which is similar to the ANDOR gate 7' of the second embodiment, but the ANDOR gate 7" is different from the ANDOR gate 7' in that the ANDOR gate 7" has three AND gates. Further, the UART of the third embodiment includes a correction mode switch flag circuit 11, an inverter gate 12, and two AND gates 13 and 14. The inverter gate 12 inverts the output of the switch flag circuit 11.

The output S2 of the flip-flop 6c and the output of the inverter gate 12 are introduced to one of the AND gates of the ANDOR gate 7". The output of the switch flag circuit 11 and the output S2' of the flip-flop 6d are introduced to the input of the AND gate 13. The output of the AND gate 13 is introduced to the ANDOR gate 7" as a signal for switching between the reference clock CLK and the doubled frequency clock. The reference clock CLK and the output of the switch flag circuit 11 are supplied to the AND gate 14 to produce a signal which determines whether the doubled frequency clock should be generated. Other elements and structure of the UART of this embodiment are similar to those of the first and second embodiments so that they will not be described here.

In the third embodiment, the correction made in the first embodiment or the correction made in the second embodiment is selected by the switch flag circuit 11. The correction itself in the third embodiment is therefore the same as the first and second embodiments, so that the following description only deals with the switching between the correction modes.

When "0" is written to the switch flag circuit 11 via the data bus 5, then the AND gates 13 and 14 are masked, generation of the doubled frequency clock is stopped, and a logic sum of the signal S2 and the reference clock CLK is supplied to the baudrate generator 1 from the ANDOR gate 7". The correction described in the first embodiment is then executed.

When "1" is written to the switch flag circuit 11 via the data bus 5, then the generation of the doubled frequency clock is admitted by the AND gates 13 and 14, and the output signal S2' of the flip-flop 6d becomes effective. On the other hand, the ANDOR gate 7" makes the output S2 of the flip-flop 6c non-effective. The correction described in the second embodiment is then executed.

Since the switching means including the correction mode switch flag circuit 11 is additionally provided for selectively performing the correction of the first embodiment and the correction of the second embodiment, the third embodiment has the advantages of the first and second embodiments and can select a suitable correction to achieve higher accuracy in accordance with a given transfer rate. The UART of the second embodiment generates the doubled frequency clock so that the correction of the second embodiment consumes more power. If the reduction of the power consumption is an important factor, the third embodiment may always select the correction of the first embodiment. In this manner, the third embodiment can arbitrarily select the correction of the first or second embodiment in accordance with an application purpose and given condition(s).

FOURTH EMBODIMENT

Figure 8:
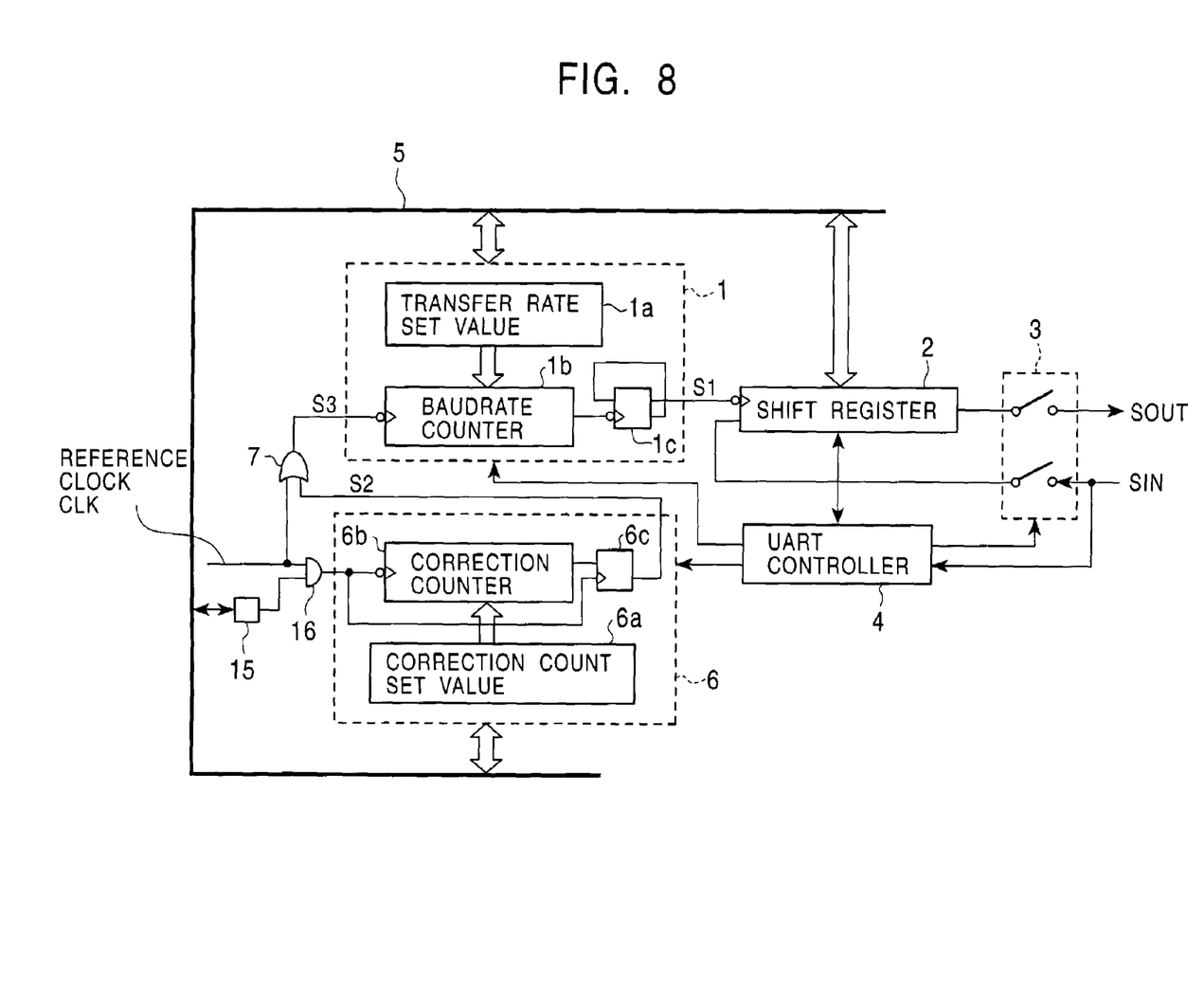
FIG. 8 illustrates a block diagram of a UART according to a fourth embodiment of the present invention.

Referring to FIG. 8, a UART according to a fourth embodiment of the present invention will be described. Similar reference numerals are used to designate similar elements in the first and fourth embodiments. As shown, a correction valid/invalid flag circuit 15 and an AND gate 16 are additionally provided in the fourth embodiment, as compared with the first embodiment. The output of the circuit 15 is introduced to one of the two inputs of the AND gate 16. The reference clock CLK is introduced to the other input of the AND gate 16. The output signal of the AND gate 16 is a clock which is counted by the correction counter 6. Other elements and structure of the UART of this embodiment are similar to those of the first embodiment so that they will not be described here.

The fourth embodiment can select activation and deactivation of the correction counter 6. The correction itself in the fourth embodiment is therefore the same as the first embodiment, so that the following description only deals with the selection between the activation and deactivation.

When "0" is written to the correction valid/invalid flag circuit 15 via the data bus 5, then the AND gate 16 masks the reference clock CLK, the clock of the correction clock 6 is held at a low level, and the correction counter 6 is deactivated.

When "1" is written to the correction valid/invalid flag circuit 15 via the data bus 5, then the AND gate 16 allows the reference clock CLK to pass through the AND gate 16, the correction counter 6 is activated, and the correction is effected. If data transmission or reception is carried out by the UART in this condition, the correction counter 6 operates and performs the correction.

As understood from the above, since the UART of the fourth embodiment includes the correction valid/invalid flag circuit 15 and the means for switching between execution and non-execution of the correction by the correction counter 6, the fourth embodiment has the advantages of the first embodiment and can selectively deactivate the correction counter 6 to reduce the power consumption of the UART when the correction is unnecessary. The correction is not needed at a certain transfer rate. The means for switching between execution and non-execution of the correction by the correction counter 6 is the AND gate 16.

It should be noted that the present invention can be applied to the data receiving operation although the data transmitting operation is only described in the first and second embodiments. Further, the present invention is not limited to the above described circuitry in which the value of the baudrate count register 1a is directly loaded to the baudrate counter 1b, and the value of the correction count register 1a is inverted before it is loaded to the correction counter 6b. Any circuitry can be used as long as the circuitry can perform the desired counting operation. Moreover, the number of the bits of the baudrate counter 1b and that of the correction counter 6b are not limited to those mentioned above.

It should also be noted that the OR gate 7 is used to temporarily stop the one reference clock in the first embodiment, but any suitable circuitry may be used instead of the OR gate 7. Likewise, the ANDOR gates 7' and 7" in the second and third embodiments may be replaced by any suitable circuitry.

The means for switching between the "correction valid" and the "correction invalid" of the fourth embodiment may be added to the second and third embodiments. The means for switching between the "correction valid" and the "correction invalid" is the AND gate 16.

Although the delay inverter 8 and XOR gate 9 are utilized to produce the doubled frequency clock in the second and third embodiment, any suitable circuitry may be employed instead.

What is claimed is:

1. An apparatus for transmitting and receiving serial data comprising:
    a counter for counting a reference clock; and
    a shift register for storing incoming or outgoing data, wherein every time the counter counts the reference clock a first number of times, which is equal to a first integer determined in accordance with a ratio of a frequency of the reference clock to a data transfer rate, the incoming or outgoing data stored in the shift register are shifted such that the incoming or outgoing data are received or transmitted at a rate substantially equal to the data transfer rate,
    the improvement comprising a clock correction unit for temporarily hindering the reference clock from being passed to the counter every time the reference clock is generated a second number of times, which is equal to a second integer determined in accordance with a difference between the ratio and the first integer.

2. The apparatus according to claim 1, wherein the apparatus is a universal asynchronous receiver transmitter.

3. The apparatus according to claim 1, wherein the data transfer rate is at least 38.4 kbps.

4. The apparatus according to claim 1, wherein one bit time is unequal to a multiple of the reference clock.

5. The apparatus according to claim 1 further including a deactivation unit for deactivating the clock correction unit when the data transfer rate is at most 9600 bps.

6. A method of transmitting and receiving serial data comprising the steps of:
    A) determining a first integer on the basis of a ratio of a frequency of a reference clock to a data transfer rate; and
    B) shifting out a bit train, which defines incoming or outgoing data, every time the reference clock is counted a first number of times equal to the first integer, thereby transmitting or receiving the outgoing or incoming data at a rate substantially equal to the data transfer rate,
    the improvement comprising the steps of:
    C) determining a second integer in accordance with a difference between the ratio and the first integer after Step A; and
    D) temporarily stopping counting the reference clock every time the reference clock is generated a second number of times equal to the second integer during Step B.

7. The method according to claim 6, wherein the data transfer rate is at least 38.4 kbps.

8. The method according to claim 6, wherein one bit time is unequal to a multiple of the reference clock.

* * * * *